(12) United States Patent
Wixey

(10) Patent No.: US 7,726,034 B2
(45) Date of Patent: Jun. 1, 2010

(54) DIGITAL PROTRACTOR

(76) Inventor: Barry Douglas Wixey, 5306 Umbrella Pool Rd., Sanibel, FL (US) 33957

( * ) Notice: Subject to any disclaimer, the term of this patent is extended or adjusted under 35 U.S.C. 154(b) by 109 days.

(21) Appl. No.: 12/075,176

(22) Filed: Mar. 10, 2008

(65) Prior Publication Data

US 2009/0038168 A1   Feb. 12, 2009

Related U.S. Application Data

(60) Provisional application No. 60/906,196, filed on Mar. 9, 2007.

(51) Int. Cl.
  *B43L 7/10* (2006.01)
(52) U.S. Cl. ...................................... 33/471
(58) Field of Classification Search .................. 33/471, 33/452, 465, 534, 538
  See application file for complete search history.

(56) References Cited

U.S. PATENT DOCUMENTS

| | | | |
|---|---|---|---|
| 4,442,606 A * | 4/1984 | Graham et al. ................. | 33/1 N |
| 4,745,689 A * | 5/1988 | Hiltz ............................ | 33/451 |
| 5,713,135 A * | 2/1998 | Acopulos ...................... | 33/451 |
| 6,104,480 A * | 8/2000 | Matzo et al. ................. | 356/148 |
| 6,401,584 B1 * | 6/2002 | Rowe ........................... | 83/829 |
| 6,560,886 B2 * | 5/2003 | Gullberg ....................... | 33/471 |
| 6,568,095 B2 * | 5/2003 | Snyder ......................... | 33/370 |
| 6,892,467 B1 * | 5/2005 | Gatzemeyer ................. | 33/613 |
| 2004/0154176 A1 * | 8/2004 | Montenegro et al. .......... | 33/471 |
| 2006/0005408 A1 * | 1/2006 | Fernand ....................... | 33/471 |
| 2007/0240321 A1 * | 10/2007 | Shapiro ....................... | 33/471 |
| 2007/0283587 A1 * | 12/2007 | Cerwin ........................ | 33/471 |
| 2009/0064516 A1 * | 3/2009 | Diaz et al. .................... | 33/451 |

* cited by examiner

*Primary Examiner*—Christopher W Fulton
(74) *Attorney, Agent, or Firm*—William E. Noonan

(57) ABSTRACT

A digital protractor for measuring angular displacement from a referenced surface includes a substantially congruent pair of pivotally interconnected upper and lower arms, which arms are superposable upon one another. Each arm has a pair of substantially parallel engagement edges extending longitudinally of the arm. One of the arms is engagable along an engagement edge thereof with the reference surface. A capacitive sensor is secured to the lower arm and a digital readout device is secured to the upper arm for operatively cooperating with the capacitive sensor to measure and display the angular displacement from the arm engaging the reference surface to the other arm.

17 Claims, 11 Drawing Sheets

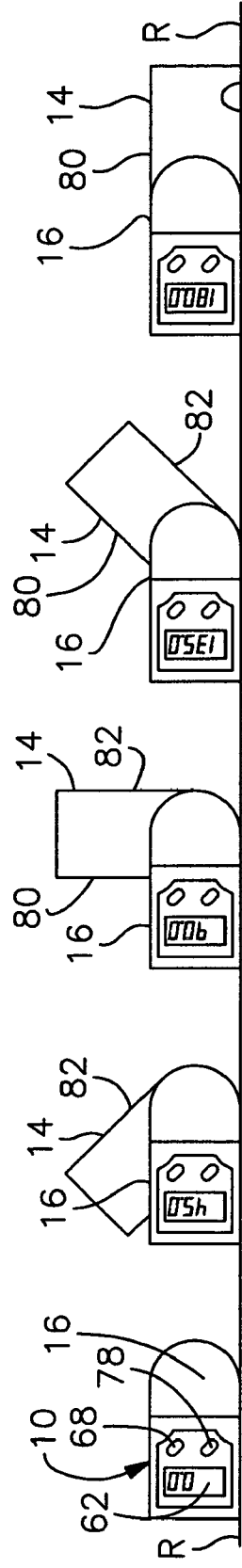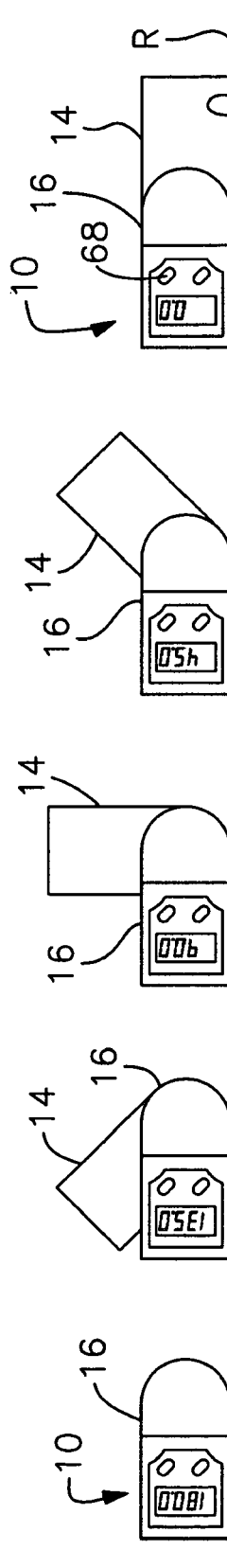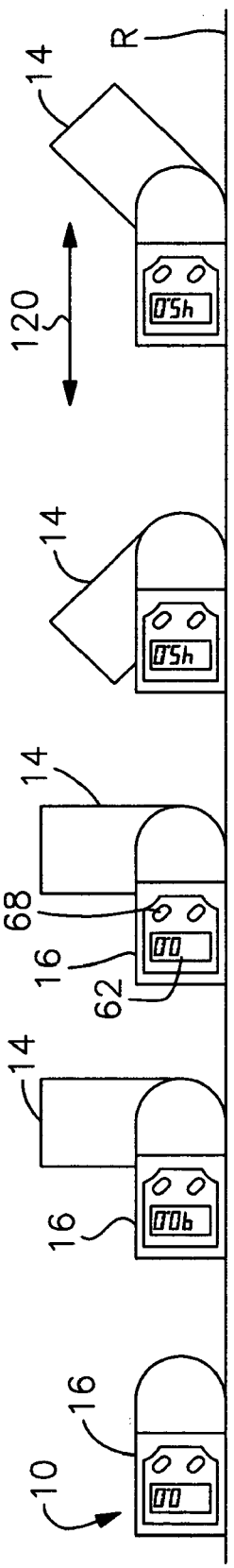

DIGITAL PROTRACTOR

RELATED APPLICATION

This application claims the benefit of U.S. Provisional Patent Application Ser. No. 60/906,196 filed Mar. 9, 2007.

FIELD OF THE INVENTION

This invention relates to a compact digital protractor, and particularly to a digital protractor that can be used in virtually any plane to measure, mark, set or adjust an angular displacement.

BACKGROUND OF THE INVENTION

A number of devices are available for digitally measuring angles and inclines. Such tools are widely used in the woodworking and metalworking industries, as well as in construction and for a wide variety of other professional and household applications. These products can be used, for example, to measure and set the miter or bevel angle of a table saw. Such tools are also used to measure and mark construction angles in boards, panels, walls, flooring and various other types of work pieces and surfaces.

Angle gauges or inclinometers are typically compact and easy to use products for measuring angles in machine and power tool applications. However, these items are limited to measuring angles in a vertical plane. Inclinometers are ineffective for measuring angles in a horizontal or non-vertical plane.

Digital protractors are available. However, conventional tools of this type are almost always quite bulky and rather awkward to use. Typically, they do not fit or operate effectively in tight spaces and in restricted machine environments. Moreover, conventional digital protractors tend to employ an intricate construction and are fairly expensive to manufacture and therefore costly to purchase. It can also be difficult to set and hold a selected angle using known products of this type.

I have determined that the need exists for a compact, easy to use and much more precise digital protractor. A particular need exists for a low cost digital protractor suitable for use both by professionals in the machining, woodworking, carpentry and construction trades, and by laymen in general household applications.

SUMMARY OF THE INVENTION

It is therefore an object of the present invention to provide a compact, easy to use and low cost digital protractor that may be used effectively to measure, set, mark and adjust precision angles in a wide variety of industrial and household applications.

It is a further object of this invention to provide a digital protractor that effectively and accurately measures angles in any plane of orientation.

It is a further object of this invention to provide a digital protractor utilizing modular and easy to assemble components that significantly reduce the cost of manufacturing the tool and which are assembled in a stacked, close-tolerance manner that allows the tool to provide an extremely high and improved level of accuracy.

It is a further object of this invention to provide a digital protractor featuring magnetic fastening components that adhere the protractor to a work surface so that improved and more precise measurements are achieved.

It is a further object of this invention to provide a digital protractor featuring an improved locking system that allows a selected angular setting to be reliably maintained during various workplace applications and as that angle is measured, marked and/or set.

It is a further object of this invention to provide a digital protractor featuring a modular, extruded construction that allows the tool to be manufactured in a variety of selected lengths suitable for assorted applications.

It is a further object of this invention to provide a digital protractor that is easy to use, more compact, more accurate and more versatile that conventional digital protractors.

This invention results from a realization that an improved, compact and highly precise digital protractor may be achieved by pivotally interconnecting a pair of substantially congruent and modular extruded arms such that the arms pivot with respect to one another in a generally laminar fashion and are superposable upon one another. When a standard capacitive based electronic measuring system is mounted on such pivotally interconnected arms, the tolerance stack-up of the components allows the protractor to provide an improved, high level of accuracy. At the same time, the slim and compact nature of the protractor makes it very easy, convenient and versatile to use in a wide variety of industrial and personal applications.

This invention features a digital protractor for measuring an angular displacement from a reference surface. The protractor comprises a substantially congruent pair of pivotally interconnected upper and lower arms, which arms are superposable upon one another. Each arm has a pair of substantially parallel engagement edges extending longitudinally of the arm. One of the arms is engagable along an engagement edge thereof with the reference surface. A capacitive sensor or other type of electronic sensor is secured to the lower arm. A digital readout device is secured to the upper arm for operatively cooperating with the sensor to measure and display the angular displacement from the arm engaging the reference surface to the other arm.

In a preferred embodiment, the digital readout includes a calibration switch that is engaged to allow the readout to display an angular displacement of zero degrees regardless of the actual angular displacement between the arms. The arms may comprise respective extruded components. Each engagement edge may carry a magnetic element for adhering to a magnetically attracted material carried by the reference surface. Each engagement edge may include a longitudinal channel for receiving a respective magnetic element therein. The upper and lower arms may comprise a pair of superposable plates interconnected by a pivot pin that extends transversely through superposed, generally flat surfaces of the plates. The upper and lower plates may be pivotable relative to one another in a generally laminar manner with a substantially flat bottom surface of the upper arm being substantially parallel to an opposing flat top surface of the lower arm.

The sensor may include an annular capacitive disk fixed to the first arm and the readout may include a signal generating circuit attached to the second arm for operatively cooperating with the capacitive disk to measure an angular displacement between the arms. A display device may be connected to the signal generating circuit for displaying the measured angular displacement between the arms. The arms may be connected by a pivot pin and angular disk may be disposed about the pivot pin. The upper arm may include a longitudinal central channel for accommodating the signal generating circuit therein. The annular disk and the signal generating circuit may be enclosed by a housing mounted to the upper arm and from which the display is exposed. A locking apparatus may be provided for holding the arms together to maintain a selected angular displacement between the arms. The arms may be pivotally connected by a pivot pin and the locking apparatus may include a lock plate secured to the upper arm and having a locking engagement surface and a central opening through which the pivot pin extends. A locking lever may be connected pivotally to the pin and extend outwardly of the upper arm for carrying a bearing. The bearing interengages the locking engagement surface of the lock plate when the lock lever is rotated about the pivot pin to hold the arms with a selected angular displacement therebetween. The locking engagement surface may include a tapered track or indented groove formed in the locking plate and the bearing may include a ball bearing carried by the locking lever and received in the tapered groove. Rotation of the lever in a selected direction directs the ball bearing into a narrow portion of the track to tighten together the upper and lower arms. This holds the arms at the selected angular displacement. Alternatively, the locking engagement surface may include one or more indentations and the bearing may include a roller bearing for frictionally engaging the one or more indentations to lock the arms in place when the locking lever is rotated in a selected direction.

DETAILED DESCRIPTION OF PREFERRED EMBODIMENTS

Other objects, features and advantages will occur from the following description of a preferred embodiment and the accompanying drawings, in which:

FIGS. 5A-5E are front elevational views sequentially depicting the use of the protractor for measuring an angle in a clockwise direction;

FIGS. 6A-6E are views similar to those of FIGS. 5A-5E but depicting the protractor being used to measure successive angles in a counterclockwise direction;

FIGS. 7A-7E are front elevational views of the protractor being calibrated with the arms in a perpendicular displacement and then used to measure angular displacement in either a clockwise or counterclockwise manner;

Figure 1:
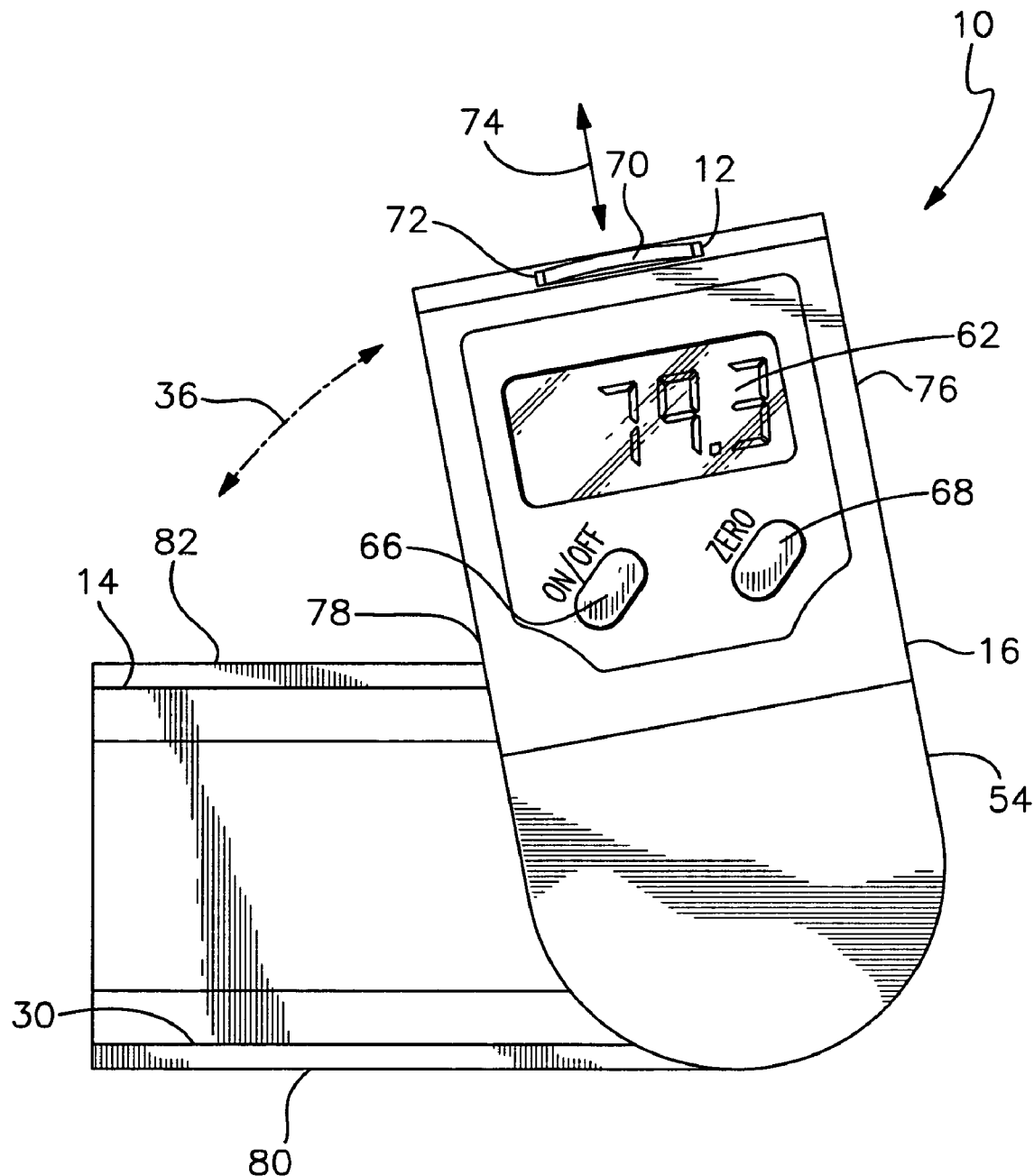
FIG. 1 is a perspective view of a preferred compact digital protractor in accordance with this invention.

There is shown in FIG. 1 a compact digital protractor 10 for measuring, marking, setting and/or adjusting angles in a virtually unlimited variety of machine, commercial, industrial, construction and household applications. The protractor is especially effective for use in setting and adjusting the angle of various tools and machines in the woodworking and metalworking industries. However, protractor 10 may be employed for many other angle measuring, marking, setting and adjustment purposes. The particular environment or application in which the protractor is used is not a limitation of this invention. Moreover, it should be understood that protractor 10 may be employed to effectively measure angles not only in a vertical plane, but also in horizontal and other orientations.

As shown in FIGS. 1-4A, protractor 10 features a pivotally interconnected pair of substantially congruent upper and lower arms 12 and 14 respectively. A digital readout comprising a digital angle gauge 16, FIG. 1, is mounted to upper arm 12. The digital readout, which utilizes conventional capacitive measurement technology and which is described in greater detail below, is mounted to upper arm 12 such as by connecting screws, not shown, which are interengaged with the readout through holes 18, FIG. 2, in upper arm 12. In alternative embodiments, the readout may feature alternative forms of electronic measurement technology utilizing, for example, optical, resistance, magnetic or alternative components.

Figure 2:
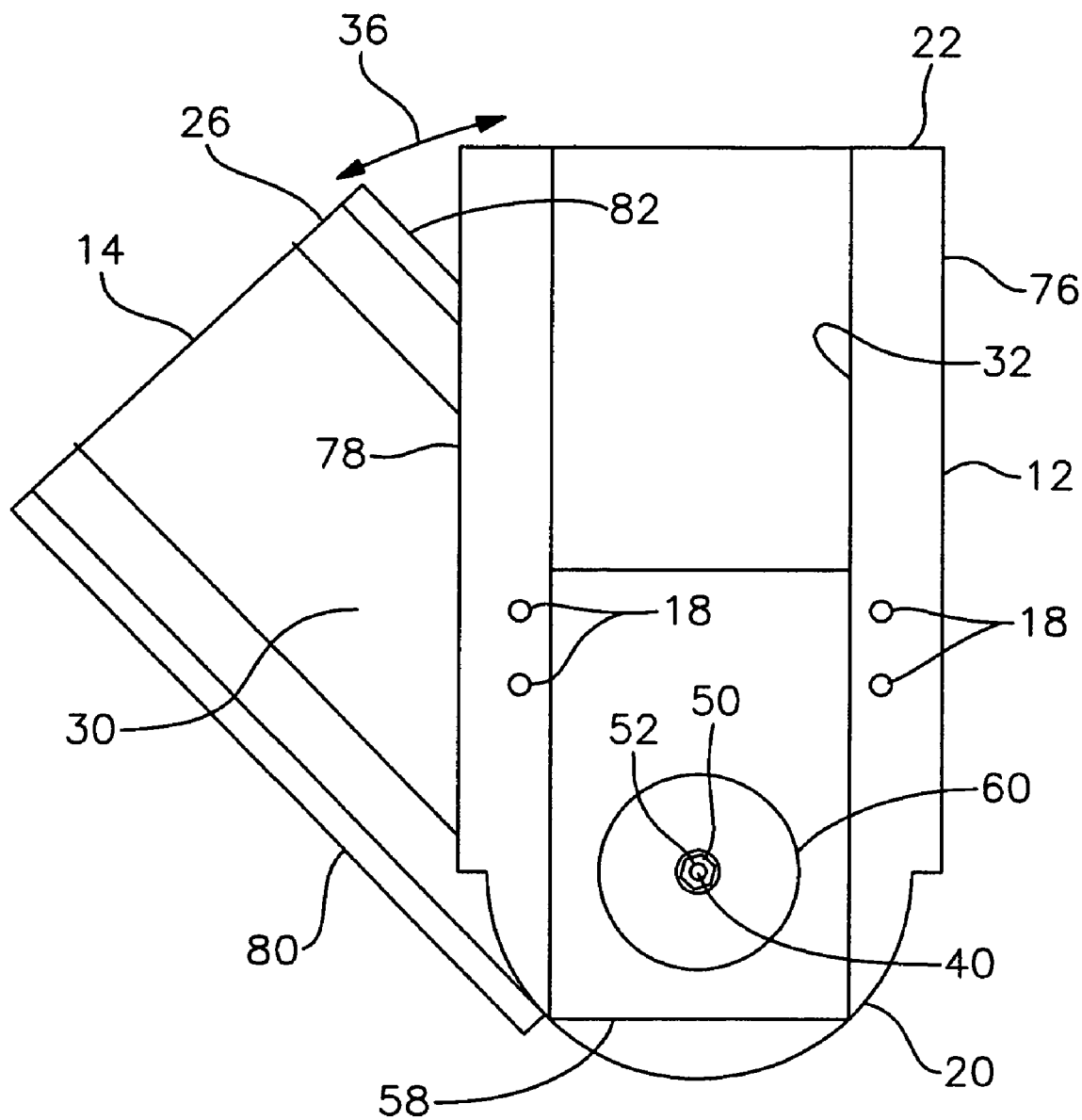
FIG. 2 is a top plan view of the pivotally interconnected arms of the protractor with the housing of the digital readout removed to depict the capacitive measurement circuitry.
Figure 3:
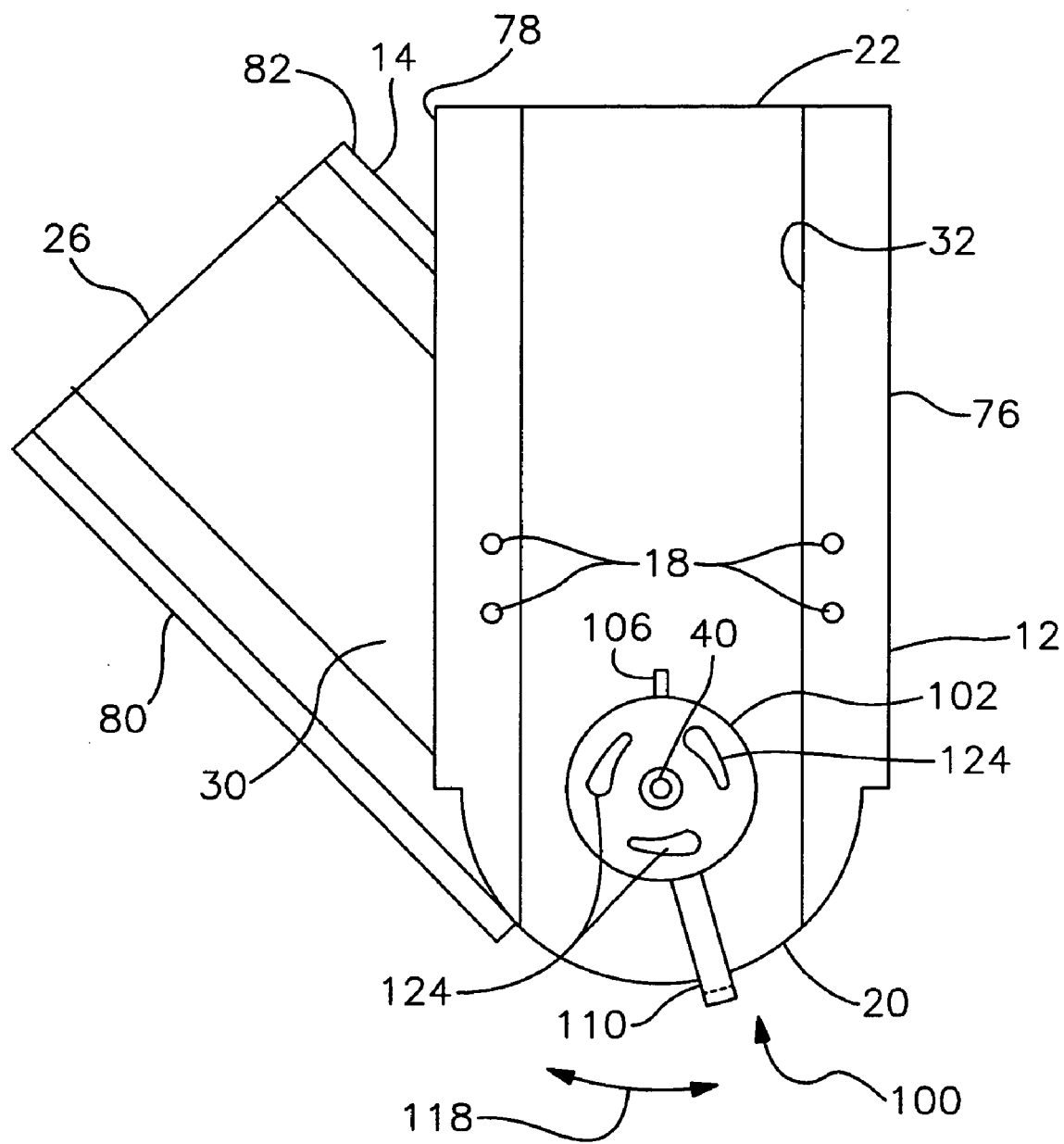
FIG. 3 is a top plan view of the pivotally interconnected arms with the readout totally removed to expose the locking mechanism for the arms.
Figure 4:
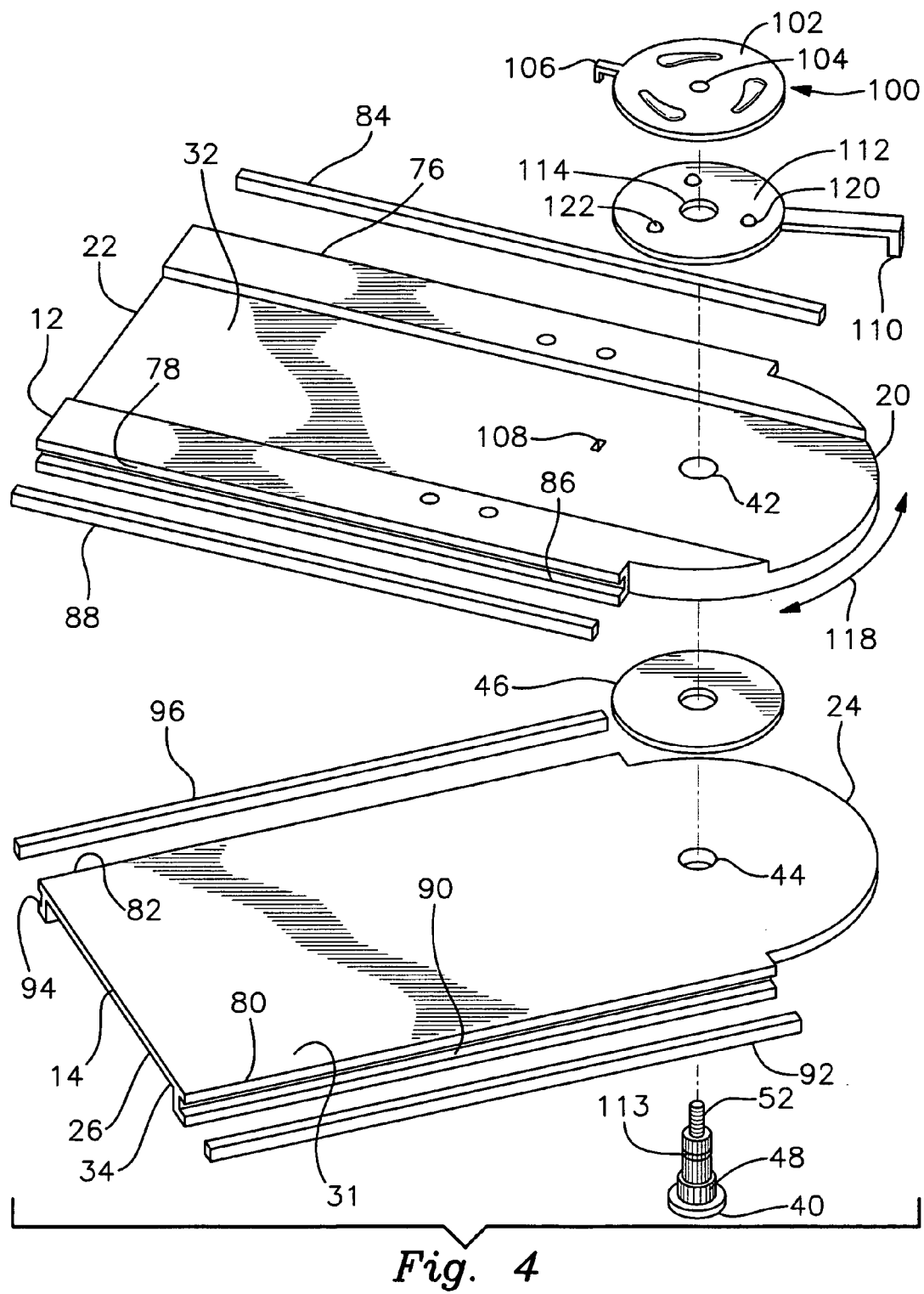
FIG. 4 is an exploded, perspective view of the upper and lower arms and the locking mechanism.

Upper and lower arms 12 and 14 comprise a pair of like or substantially congruent extruded aluminum plates, which are fairly thin (e.g. less than ¼" thick). The arms may be composed of various alternative metals and metal alloys. Synthetic materials may also be employed. Each arm features a modular construction, which facilitates manufacture of the arms. As best depicted in FIGS. 2-4, one end of each arm (i.e. the pivot end) is rounded, whereas the opposite end is cut perpendicularly to the longitudinal axis of the arm. More particularly, the upper arm has a curved or rounded pivot end 20 and a straight, perpendicularly cut distal end 22. Likewise, lower arm 14 has a rounded pivot end 24 and a straight cut opposite end 26, FIG. 4. By perpendicularly cutting the extruded arm at a selected point, the arms may be constructed to have assorted selected lengths. This allows the protractor to be used conveniently in a wide variety of applications and workplace environments. In FIG. 1 readout 16 has a length and configuration generally equivalent to those of upper arm 12. As a result, the upper arm is largely obscured by the readout in FIG. 1. However, in alternative versions of this invention wherein a longer arm is utilized, the arm clearly extends beyond the digital readout (see for example the version with extended, 8" arms in FIGS. 8 and 9).

As used herein "substantially congruent" means that the plate-like upper and lower arms 12 and 14 have very similar, if not identical shapes. It should be understood that the respective arms may have slightly different configurations or shape variations and still be substantially congruent within the scope of this invention. Nonetheless, to achieve the most accurate and precise measurements and reliability, the upper and lower arms should be very similar if not identical in shape. It is also preferred that each arm have a generally flat or planar shape. This means that each plate has a length and a width that are significantly greater than its thickness. For example, in the 3" version shown in FIGS. 1-7E, the plate may have an overall length of approximately 4" and a width of approximately 2", in contrast to a thickness of less than ¼. Each arm extends from approximately 3" from its pivot point to its distal end. As previously indicated, the length can be varied significantly within the scope of this application to enable a wider variety of uses for the protractor. Although each plate is generally flat and planar, this does not mean that the modular plate has perfectly flat or smooth upper and lower surfaces. Rather, as depicted in FIG. 1, the inner surface of each arm (e.g. the top surface 30 of lower arm 14) includes extruded lines, striations and texturing. Moreover, as depicted in FIGS. 2-4, the outwardly facing surface of each arm 12, 14 includes a longitudinal central channel. In particular, a channel 32, which is approximately ⅛" in depth, is formed longitudinally and centrally in upper arm 12. As best shown in FIG. 4, an analogous central channel 34 is formed longitudinally in lower arm 14. These longitudinal channels are formed in the arms using conventional extrusion techniques.

The plate-like upper and lower arms 12 and 14 are pivotally interconnected in a manner that allows the arms to pivot in a generally laminar fashion relative to one another as indicated by doubleheaded arrow 36 in FIG. 1. Arms 12 and 14 are pivotally joined by a pivot pin 40, FIG. 4, that extends through aligned holes 42 and 44 formed respectively in upper and lower arms 12 and 14. A washer 46 is disposed between the upper and lower arms. A knurled (or alternatively keyed) portion 48 of pin 40 secures the pin to lower arm 14 and prevents rotation between the lower arm and the pin. On the other hand, upper arm 12 is rotatable about a barrel of pivot pin 40. As is described more fully below, after the capacitive sensor and locking device have been installed, the arms 12 and 14 are joined together by securing a nut 50, FIG. 2, to the upper threaded stem 52, FIG. 4, of pivot pin 40. As a result, the upper and lower arms are pivotally joined.

Figure 4A:
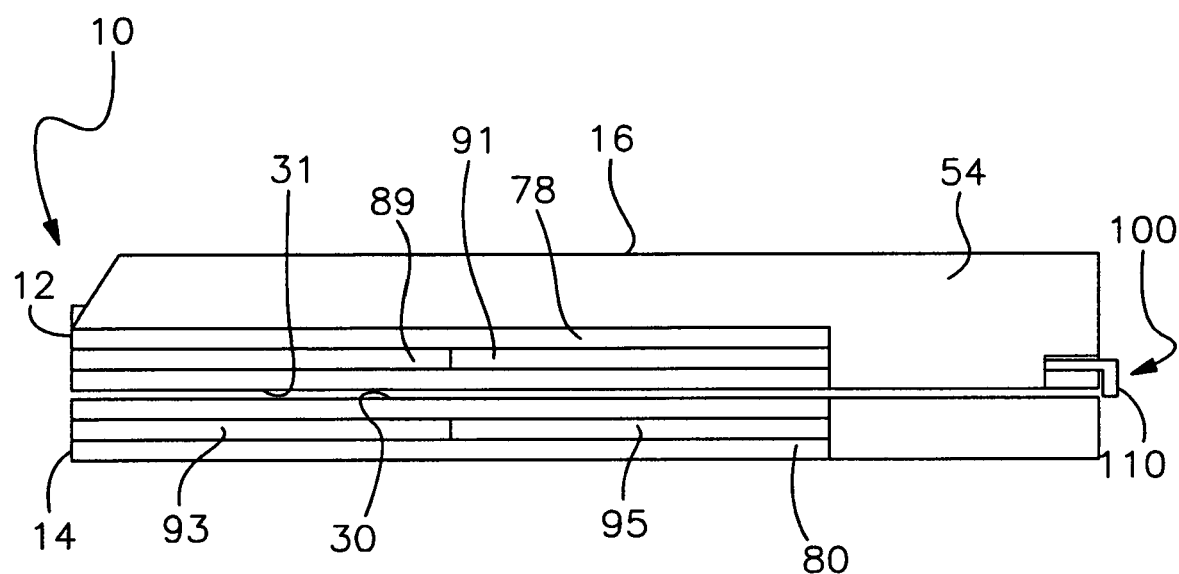
FIG. 4A is a side elevational view of the preferred digital protractor

The fully assembled protractor 10 is depicted in FIG. 4A. In this view, the upper and lower arms 12 and 14 are aligned such that they are superposable upon one another when pivoted closed. As the arms are pivoted together or apart as indicated by doubleheaded arrow 36 in FIG. 1, they pivot or slide over one another in a generally laminar fashion. In other words, upper plate-like arm 12 is generally stacked or layered upon lower arm 14. The substantially flat bottom surface 31 of upper arm 12 is parallel to the similarly flat top surface 30 of lower arm 14. The upper and lower arms are normally separated by a minute gap that allows the arms to pivot in a generally flush, laminar manner relative to one another. When the upper and lower arms are aligned as shown in FIG. 4A, as well as in FIGS. 5A, 6E and 7A, the substantially congruent upper and lower arms are likewise superposed upon one another. This provides protractor 10 with an efficient and compact stacked construction that achieves a high level of accuracy in angular measurements.

As shown in FIGS. 1 and 4A, digital readout 16 comprises a plastic housing 54 that encloses a printed circuit board 58 recessed within central channel 32 of upper arm 12. As previously indicated, housing 54 of readout 16 is secured to the upper arm by screws engaged with mounting holes 18 in arm 12. Readout 16 employs conventional capacitive measuring technology, which will be understood to persons skilled in the art. This comprises a digital readout system that is used, for example, on standard digital calipers. The circuit board has a repeating pattern that is etched upon the board. A capacitive sensor 60, FIG. 2, is mounted fixedly to pivot pin 40. In particular, the capacitive sensor comprises an annular disk having a central opening through which threaded upper stem 52 of pivot pin 40 extends. Nut 50 is tightened onto threaded upper stem 52 to secure the capacitive sensor disk 40 to the pivot pin. The opening in the disk is keyed to the pin or otherwise fixed (e.g. by a knurl 113, FIG. 4) against rotation relative to the pin. Sensor 60, FIG. 2, includes an etched pattern that is similar to that formed in printed circuit board 58. The board 58 rotates with upper arm 12, whereas sensor 60 remains fixed relative to lower arm 14. In operation, as the arms are pivoted relative to one another, as indicated by doubleheaded arrow 36, the corresponding patterns on sensor 60 and circuit board 58 pass over each other. This causes an electronic signal to be generated in a conventional manner. The circuit on board 58 generates a signal representative of the angular displacement between the legs. This signal is converted by the circuit of the reader to a rotation angle that is displayed on LCD display 62, FIG. 1. Once again, the operation of the readout device comprises conventional capacitive measuring technology, which will be understood to persons skilled in the art. In alternative embodiments, a pair of capacitive sensor wheels or disks may be utilized.

Readout 16 is selectively activated and deactivated by a conventional on/off switch 66. The digital readout also features a calibration switch 68 that is labeled "zero" on the front panel of the readout. Power supplied by a standard battery (not shown) that is accommodated within the housing of the readout and, more particularly, within a battery holder 70 that is slidably inserted into and removed from a compartment or slot 72 formed in the upper end of the readout. The battery holder is selectively introduced into or removed from slot 72 as indicated by doubleheaded arrow 74.

Digital readout 16 is activated by pressing button switch 66. The battery supplies power to the angle measuring circuitry, as well as to display 62 in a conventional manner. Calibration switch 68 is selectively depressed so that the readout is zeroed and so that the measurement "0.0°" is displayed in LCD format on display 62. The pivotally attached arms are then adjusted as needed to perform the desired angular protractor function. Such operation is described in greater detail below.

Each of arms 12 and 14 includes a pair of opposite side engagement edges, which are utilized to engage protractor 10 against a reference surface from which an angular measurement is to be taken. In particular, upper arm 12, FIGS. 1-4A, includes a substantially parallel pair of side engagement edges 76 and 78 that extend longitudinally of arm 12. By the same token, lower arm 14 includes parallel side engagement edges 80 and 82 that extend longitudinally of arm 14. It should be noted that because the upper arm 12 and readout housing 54 have generally the same width, the side engagement edges of arm 12 are largely obscured by the side edges of the housing in FIG. 1. Each of side engagement edges 76 and 78 is effectively coplanar and aligned with a corresponding edge of the readout housing. In some versions, the side engagement edges of upper arm 12 may protrude slightly beyond the corresponding side edges of housing 54.

Each of the side edges 76, 78, 80 and 82 is perfectly straight so that, as required, it is able to flushly engage a reference surface from which a selected angle is to be measured, marked or set. As best shown in FIGS. 4 and 4A, each side engagement edge includes a longitudinal channel or track for receiving and holding a respective magnet component. Specifically, side engagement edge 76 includes a longitudinal track (obscured in FIG. 4) for receiving a elongate magnetic component 84. Opposite side edge 78 includes an elongate track 86, which receives an elongate magnetic component 88. The side engagement edge 80 of lower arm 14 features a longitudinal track 90 for receiving an elongate magnetic component 92. Analogously opposite side engagement edge 82 features an elongate track 94, which receives an elongate magnetic component 96. In each case, the magnetic component is secured permanently within the track utilizing a tight fit, complementary keyed shapes, adhesives or various other known means. In alternative versions, each of the magnetic components may comprise multiple discrete segments that are aligned end-to-end within the respective tracks. In some versions, the magnetic components may be formed integrally or unitarily with the side engagement edges of the upper and lower arms 12 and 14. In any case, the magnetic components should exhibit sufficient magnetic force so that the side engagement edges 76, 78, 80 and 82 are able to adhere securely to a magnetically attracted metal surface of the type featured in saws, lathes and various other types of machines and tools. Indeed, the magnetic side edges allow the protractor to effectively engage almost any metal reference surface in commercial, industrial or household applications. Nonetheless, as is described below, in some applications, the arms and/or engagement edges of protractor 10 may be engaged with non-magnetic/non-metallic reference surfaces. Non-magnetic engagement edges may also be used in each arm 12, 14.

FIGS. 3-4A depict a mechanism 100 for temporarily locking arms 12 and 14 in a fixed or set angular position. Mechanism 100 includes a disk-shaped locking plate 102 that is axially mounted upon pivot pin 40. In particular, the pivot pin extends through a central opening 104 in locking plate 102. A unitary finger or detent 106 extends radially from the circumferential edge of plate 102. The detent has a depending distal end that is engaged in a slot 108 formed in central recess 32 of upper arm 12. This holds locking plate 102 in place and prevents it from rotating about pivot pin 40.

The locking mechanism 100 further includes a locking lever 110 that is attached to and extends radially from a bearing carriage 112. The bearing carriage has a generally disk-shaped configuration and is sandwiched between locking plate 102 and the top surface of arm 12. As with locking plate 102, carriage 112 includes a central opening 114, FIG. 4, that is aligned with both central opening 104 of locking plate 102 and opening 42 in arm 12. Pivot pin 40 is received through these aligned holes such that carriage 112 is rotatable about pivot pin 40 and lever arm 110 is rotatably adjustable as indicated by doubleheaded arrow 118 in FIGS. 3 and 4.

Carriage 112 includes three spaced apart openings or receptacles 120, each of which accommodates a respective ball bearing 122. Locking plate 102 is superposed above and interengaged with carriage 112. The locking plate is held down against the carriage by nut 50 (FIG. 2). The locking plate includes three tapered indented grooves 124 formed in the bottom surface of plate 102 (i.e. the surface interengaging carriage 112). More particularly, each tapered groove 124 receivably interengages a respective one of the captured ball bearings 122 held by carriage 112. As a result, by turning locking lever 110 selectively to the left or right, the user may respectively tighten or loosen the interengagement between the pivotally interconnected arms 12 and 14. If lever 110 is pivoted in a clockwise direction, carriage 112 is rotated such that ball bearings 102 engage the narrow or shallow ends of respective grooves 124 in locking plate 102. This effectively squeezes the ball bearings between plate 102 and arm 12 and thereby frictionally tightens upper arm 12 against lower arm 14 so that an angle set between the arms is maintained. To loosen or unlock the protractor, the user simply pivots lever arm 110 in a counterclockwise direction. This causes the carriage 112 to move ball bearings 122 into the wider, deeper sections of respective grooves 124. Tension caused by the ball bearings between plate 102 and arm 12 is reduced. This loosens the interconnection between arms 12 and 14 and allows the respective arms 12 and 14 of protractor 10 to pivot freely relative to one another so that subsequent measurements or other protractor operations may be performed.

Protractor 10 is extremely versatile and allows angular measurements to be taken in either clockwise or counterclockwise directions, in virtually any plane or orientation and from virtually any type of reference surface. Angular measurements may be taken in a clockwise direction as depicted in FIGS. 5A-5B. Initially, the pivoting arms of protractor 10 are folded into a closed and aligned condition. On/off button 78 is actuated to activate the digital protractor. Calibration switch 68 is then pressed to set an angle of 0.0 degrees on display 62. Due to the substantially congruent shapes of the pivotally interconnected legs, as well as the generally conforming shape of readout 16, the legs are generally obscured in FIG. 5A. Protractor 10 is engaged with the reference surface R such that the side engagement edges 78 of arm 12 and 80 of arm 14 (see FIGS. 2 and 3) directly engage reference surface R. If the reference surface includes a metallic, magnetically attracted material, the side engagement edges will adhere securely to the reference surface.

Clockwise angular measurements are then taken, as required, in the sequence shown in FIGS. 5B-5E. Lower leg 14 is pivoted relative to the upper leg (and attached readout) to an angle being measured, set, marked or adjusted according to the particular application involved. In FIGS. 5B-5E representative angles of 45°, 90°, 135° and 180° respectively are depicted. Typically, engagement edge 82 of lower arm 14 corresponds with and/or engages a second surface or other location angularly displaced from reference surface R. The intermediate displacement angle between surface R and engagement edge 82 is typically the angle being measured, set or marked by the protractor. Nonetheless, in some applications, the opposite parallel edge 80 of arm 14 may be utilized as required to measure, set or mark the required angle. In either event, because the side engagement edges of each arm are parallel, the same angular displacement is provided. It should be noted that although the magnetic component carried by each engagement edge securely adheres its respective arm to a magnetically attracted reference surface, such magnetic attraction may be simply overcome by the user exerting a modest, intentional degree of force to separate the arm from reference surface R. This allows the disengaged arm to be pivoted as needed to perform a desired angular operation with protractor 10.

FIGS. 6A-6E depict device 10 being utilized to perform angular measurements relative to reference surface R in a counterclockwise direction. This is accomplished by initially opening arm 14 relative to the upper arm and congruent readout device 16. The pivotally interconnected arms are separated at an angle of 180° (FIG. 6A). The on/off switch is actuated to activate the readout and calibration switch 68 is actuated to display a reading of 0.0 degrees. Counterclockwise measurements may then be taken by pivoting arm 14 in a counterclockwise direction relative to readout 16, as indicated in FIGS. 6B-6E. Those figures depict representative angular readings of 45°, 90°, 135° and 180° respectively. In each case, the readout and its attached upper arm remain magnetically engaged along the engagement edge of the upper arm to reference surface R. Initially (FIG. 6A), lower arm 14 is likewise engaged along its engagement edge 82 with reference surface R. To perform selected angular measurements as shown in FIGS. 6B-6E, the operator simply pulls engagement edge 82 apart from reference surface R and pivots arm 14 to the angular degree needed or desired to meet the particular application involved. As the arm pivots, the capacitive measurement electronics within readout 16 operate in the previously described and known manner so that the angle that arm 14 forms with reference surface R is progressively displayed in the manner shown in FIG. 6B-6E.

FIGS. 7A-7E again depict protractor 10 engaging reference surface R. In this instance, readout 16 is calibrated to provide a reading of 0.0 degrees when arm 14 is pivoted so that it is axially perpendicular to readout 16 and its attached upper arm. With protractor 10 zeroed in this position (i.e. FIG. 7C), angular measurements may be taken in either a clockwise or counterclockwise direction as depicted by double-headed arrow 120. Initially, protractor 10 is set against reference surface R as depicted in FIG. 7A. Arm 14 is then pivoted to a perpendicular position as shown in FIG. 7B. Calibration switch 68 is actuated to zero the protractor (i.e. 0.0 degrees appear on display 62). From this point, angular measurements and other functions may be performed in either a counterclockwise direction, FIG. 7D, or a clockwise direction, FIG. 7E, as needed. For example, respective readings of 45° are provided when lower arm 14 is pivoted either to the left, FIG. 7D, or to the right, FIG. 7E. Significantly improved protractor versatility in various environments and angular displacement scenarios is thereby achieved.

Figure 8:
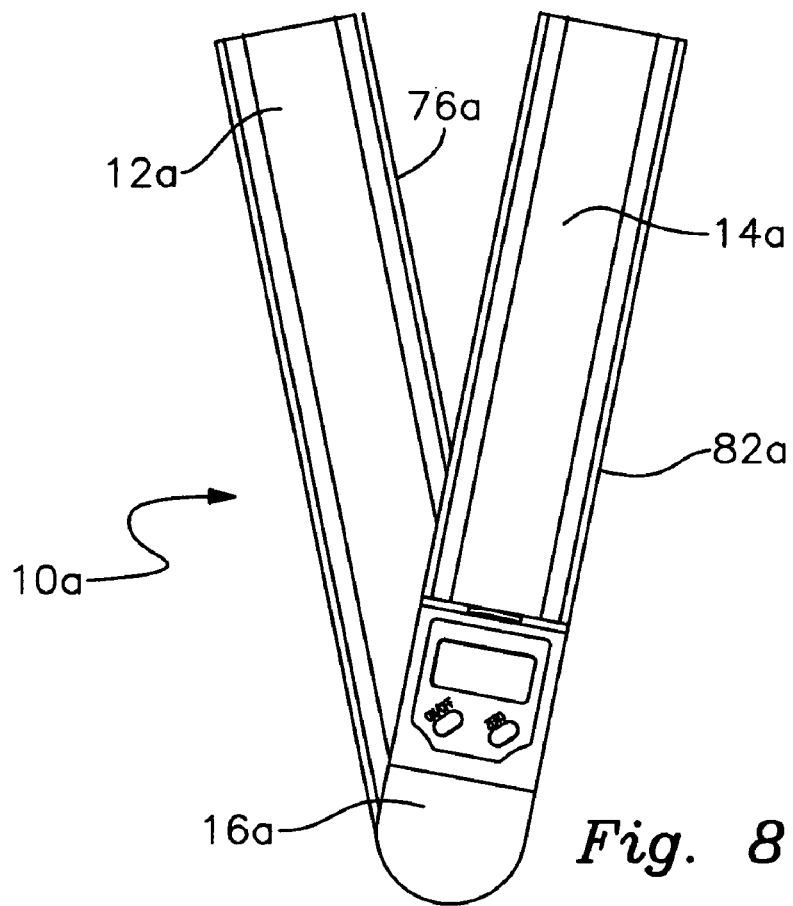
FIG. 8 is a front elevational view of an alternative digital protractor, in accordance with this invention, featuring extended upper and lower arms.
Figure 9:
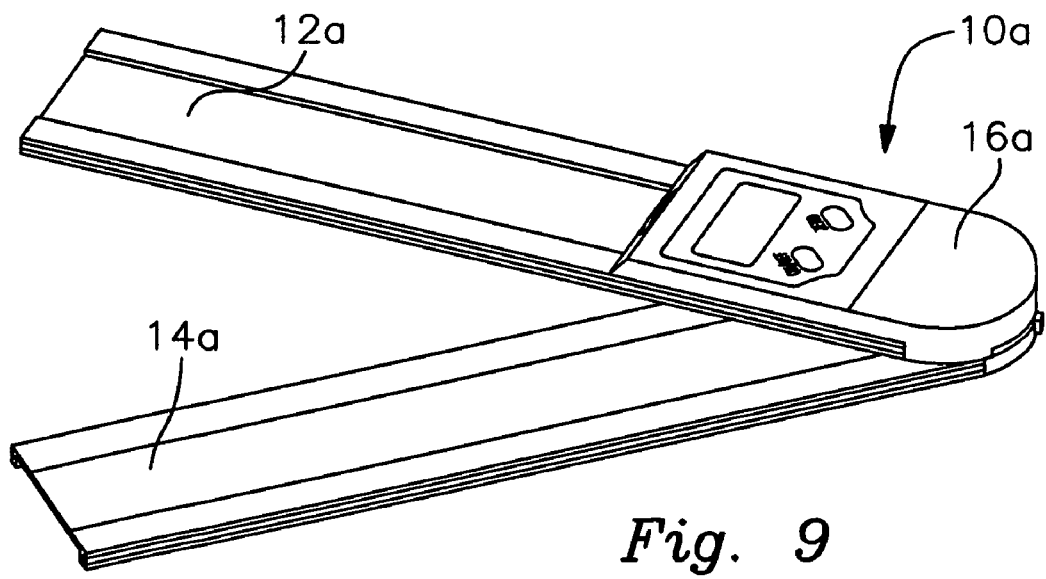
FIG. 9 is a perspective view of the protractor of FIG. 8.

As previously indicated, the digital protractor may employ arms of assorted lengths. FIGS. 8 and 9 depict an alternative digital protractor 10a in accordance with this invention wherein the upper and lower arms 12a and 14a respectively have lengths of, for example, 8". This length is generally determined from the pivot pin. In the previous version of FIGS. 1-7E, the arms have a length of approximately 3" from the pivot pin. Various other lengths may be utilized in accordance with the particular measurements, functions, machines and environments involved. In all respects other than length, arms 12a and 14a are constructed and operate analogously to the protractor arms previously described. Likewise, protractor 10a employs a digital readout 16a that is equivalent or very similar to the previously described readout, as well as other angular readouts used in the prior art.

Figure 10:
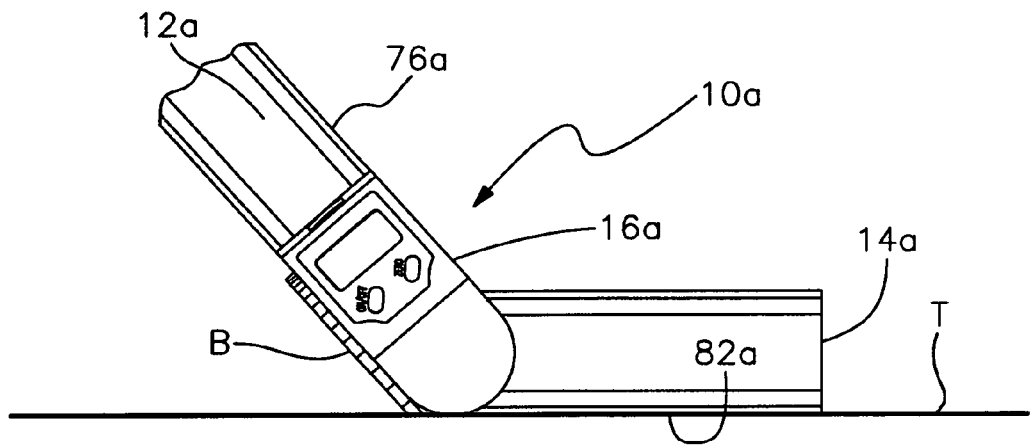
FIG. 10 is a perspective view of the embodiment of FIGS. 8 and 9 wherein the protractor is utilized to measure a bevel angle of a table saw.
Figure 11:
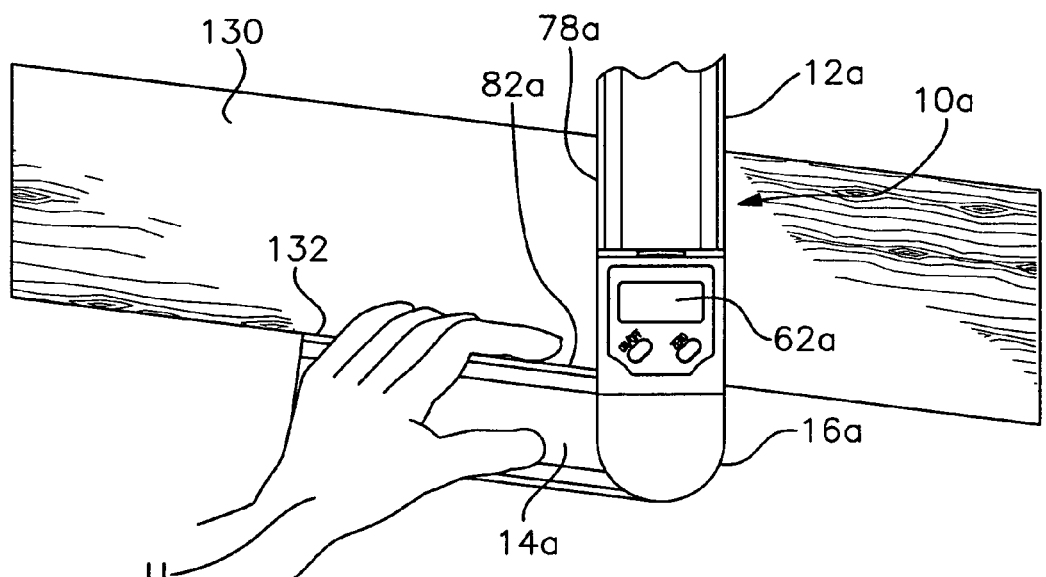
FIG. 11 is a perspective view of the protractor of FIGS. 8 and 9 being utilized to mark a board in order to make a selected transverse angular cut across the board.
Figure 12:
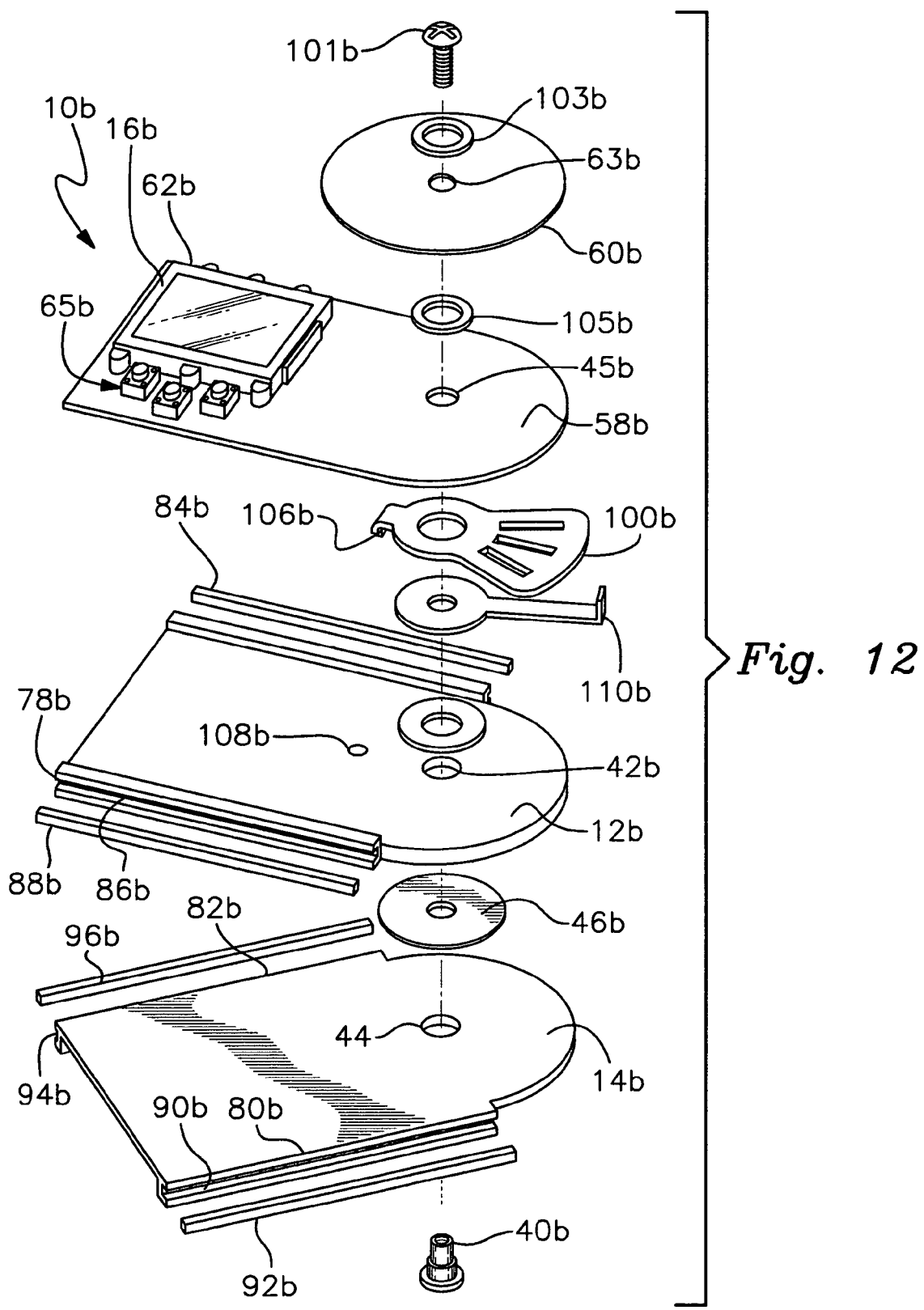
FIG. 12 is an exploded, perspective view of another alternative digital protractor in accordance with this invention.
Figure 13:
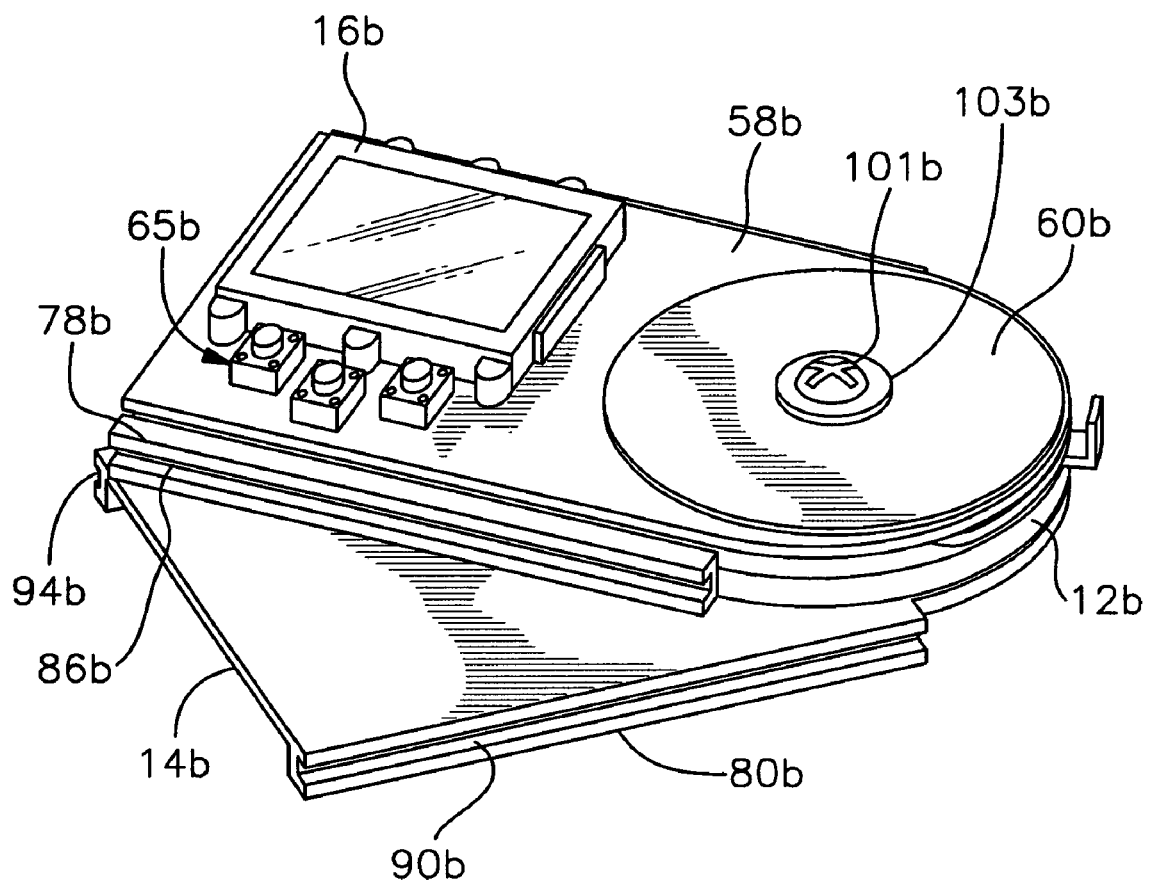
FIG. 13 is a perspective view of the protractor of FIG. 12 with the housing removed to depict the internal components of the readout.
Figure 14:
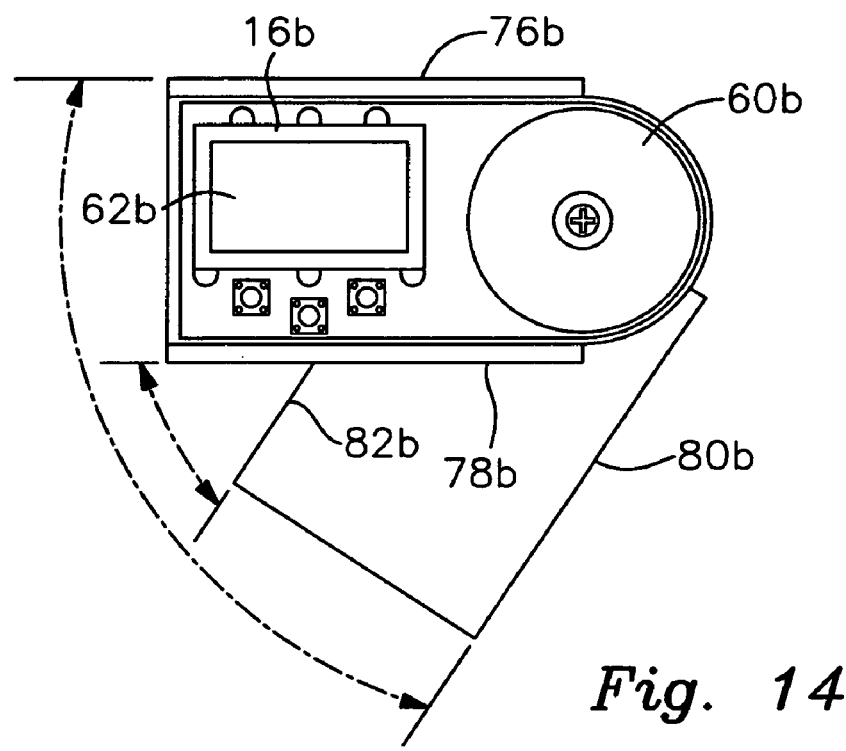
FIG. 14 is a top plan view of the protractor of FIGS. 12 and 13 with the housing removed.

FIGS. 10 and 11 depict protractor 10a being used to perform angular measurements for various purposes. For example, in FIG. 10, the protractor is measuring and/or setting the miter angle of a miter saw machine. Initially, the upper and lower arms 12a and 14a are pivotally aligned in the manner, for example, shown in the prior embodiment in FIGS. 4A, 5A and 6A. Side engagement edges 76a and 82a of respective arms 12a and 14a are engaged with metallic tabletop T. This enables arms 12a and 14a to magnetically adhere to the tabletop in a secure manner. The readout 16a is turned on and calibrated to 0.0 degrees. The user then grasps arm 12a and pulls it apart from the tabletop. The arm and attached readout 16a are pivoted relative to arm 14a, which remains engaged with tabletop T. Arm 12a and attached readout 16a are pivoted until they engage table saw blade B in the manner shown. The capacitive measurement technology utilized by the readout causes the angle between blade B and tabletop T to be measured and displayed by the readout. If required, arms 12a and 14a can then be locked in a set angular position. Measurements can be taken, the blade can be adjusted and other necessary operations can be performed.

FIG. 11 depicts protractor 10a being used to mark a board 130 so that the board can be transversely cut at a selected angle. Preliminarily, the arms 12a and 14a are aligned and the readout is activated and zeroed in the previous described manner. User U places engagement edge 82a of lower arm 14a against a side edge 132 of board 130. Upper arm 12a and attached readout 16a are then pivoted in a laminar manner relative to lower arm 14a until a predetermined cut angle is displayed on display 62a. Lower arm 12a thereby provides a guide of the correct angle to cut across board 130. User U marks the board by drawing a line across the board that corresponds with engagement edge 78a of upper arm 12a. The user then removes the protractor and cuts the board transversely along the marked line. The protractor allows the operation to be performed quickly, conveniently and accurately. The digital readout and compact stacked configuration of the protractor components provide for an extremely high degree of angular precision to be achieved.

Figure 15:
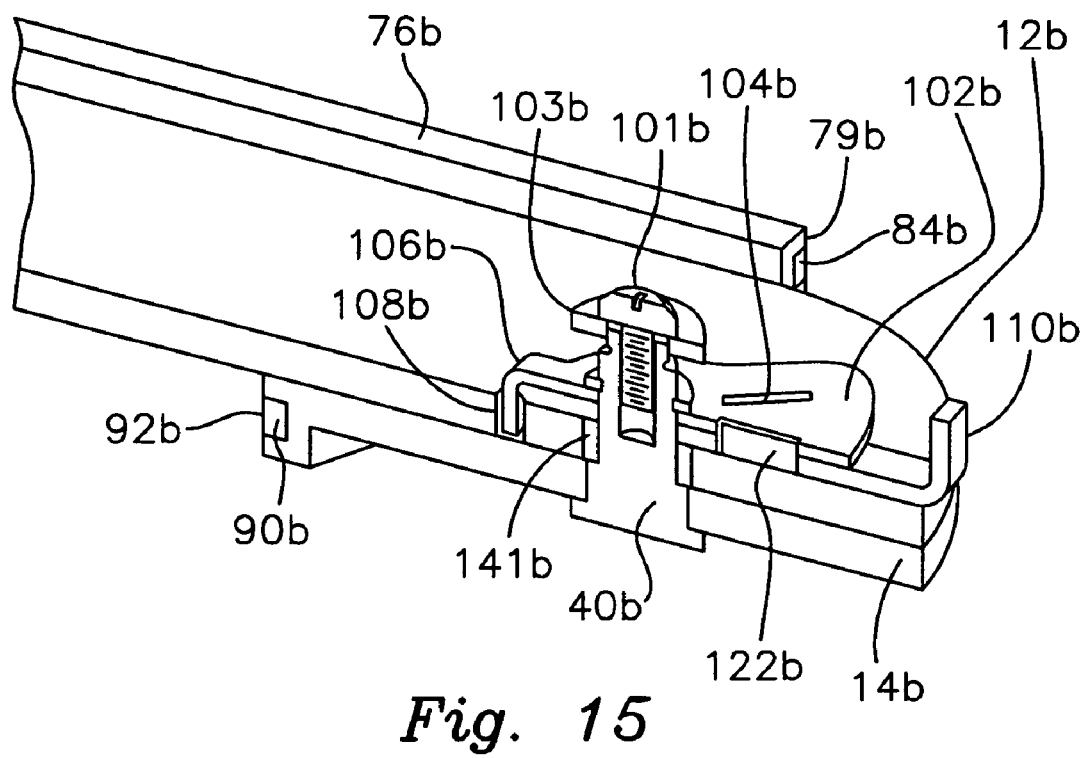
FIG. 15 is perspective, cross sectional view of the protractor of FIGS. 12-14, particularly illustrating the pivotal interconnection of the upper and lower arms and the alternative locking mechanism utilized with this version.

FIGS. 12-15 depict a slightly different version of the digital protractor. In particular, protractor 10b comprises pivotally interconnected and substantially congruent upper and lower arms 12b and 14b composed and manufactured analogously to the previously described arms. Once again, each of the arms is generally planar and has a pair of opposing, generally parallel side engagement edges. In particular, upper arm 12b include engagement edges 76b and 78b. Lower arm 14b likewise includes side engagement edges. Each of the side engagement edges carries a longitudinal track. For example, a longitudinal track 86b is formed in side edge 78b of arm 12b. Track 79b, FIG. 15, is formed in side edge 76b. Likewise, lower arm 14b comprises tracks 90b and 94b that are formed in side engagement edges 80b and 82b respectively. As in prior embodiment, the longitudinal tracks defining the side edges of the arms may be formed unitarily with or separately from the remainders of the arms. Due to the tracks formed along the longitudinal side edges, a central longitudinal recess is formed in each arm. Each of the longitudinal tracks receives a respective elongate magnetic element for adhering to a reference surface during the angular measurement process. See, in particular, elements 74b, 88b, 92b and 96b received by longitudinal tracks 79b, 86b, 90b and 94b respectively. As in the prior embodiment, each magnetic element may comprise a single or multiple pieces of magnetic material that are secured within the tracks by various means. This may include an enlarged track interior for receiving the magnetic component with a reduced width entrance (such that the magnetic component is essentially captured within the track), complementary keyed shapes and/or appropriate adhesives. In any case, the magnetic elements are securely fastened and held within the respective longitudinal tracks. In still other embodiments, the engagement edges may themselves comprise unitary or integral magnetic material.

Once again, a standard digital gauge/readout device 16b comprising a printed circuit board 58b and an electronically connected display 62b are utilized in the protractor 10b. In the version shown in FIGS. 12-15, a housing is omitted for clarity. However, it should be understood that a housing analogous to that previously described will typically be used to enclose the components of readout device 16b. That housing is attached to the upper arm in a manner analogous to that previously described. A plurality of function buttons 65b, including for example, an on/off button, and a zero switch as previously described, are interconnected with the display and printed circuit board in a standard manner, again, similar to that previously described.

As in the prior embodiment, the readout utilizes capacitive measurement technology (or other electronic measuring circuitry) in a well known or standard manner. A disk-shaped capacitive sensor 60b is fixed to the pivot pin 40b that pivotally interconnects the upper and lower arms 12b and 14b. That pivot pin extends through aligned openings 42b and 44b in arms 12b and 14b respectively. The lower arm is itself keyed to the pivot pin or otherwise held in place relative to the pivot pin by circumferential knurls formed in the pivot pin. A washer 46b separates the upper and lower arms. Pivot pin 40b likewise extends through an opening 45b in circuit board 58b. A central opening 63b in sensor 60b aligns with hole 45b in circuit board 58b. A connecting screw 101b engages the central opening of pivot pin 40b to join together the upper and lower arms 12b, 14b, circuit board 58b and capacitive sensor 60b. In addition, the locking mechanism is attached about the pivot pin in a manner similar to that previously described and as more fully described for this embodiment below. Washers 103b and 105b are disposed about the pivot pin 40b respectively above and below sensor 60b. Opening 63b is keyed to the pivot pin or fixed by knurls or otherwise so that it does not rotate relative to the pivot pin. In this manner, sensor 60b is again secured to the pivot pin and lower arm. A bushing 141b allows the upper arm 12b to rotate freely about pivot pin 40b.

The alternative version of this invention likewise employs a locking mechanism 100b. That mechanism comprises a locking plate 102b having radial indentions 104b formed therein. Plate 102b includes a bent finger or detent 106b that is received in locking slot 108b in arm 12b. This holds the locking plate securely in position against upper arm 12b. That plate does not rotate relative to the upper arm.

A locking lever 110b is rotatably mounted to pivot pin 40b. The locking lever carries several captured roller bearings 122b (only one of which is shown) that frictionally engage respective indentations 104b when lever 110b is rotated into a locking position. Alternatively, lever 110b can be rotated to the opposite release position to frictionally disengage rollers 122b from indentations 104b. This allows the protractor to be selectively locked, with a predetermined intermediate angular displacement between arms 12b and 14b, in a manner analogous to the previously described embodiment. Other forms of selectively tightening the interengagement of arms 12 and 14 may be used within the scope of this invention.

The version of FIGS. 12-15 operates in a manner analogous to the embodiment previously described. In particular, the readout is activated and calibrated to provide a measurement of 0.0 degrees on the display 62b. An engagement surface of one of the arms 12b and 14b is engaged (magnetically or otherwise) with a reference surface (i.e. the tabletop of a saw or other machine). The other arm is then pivoted to a saw blade, cut line, wall surface, machine gate or other relevant surface to be measured, marked, set and or adjusted. This allows the operator to quickly, conveniently and precisely make angular measurements, markings, settings and/or adjustments as needed. The angle between the arms is quickly, conveniently and securely locked and subsequently released as needed.

As in the prior embodiment, readout 16b may alternatively utilize other systems of electronically measuring and displaying angular displacement. For example, the electronic sensor carried by the lower leg may feature optical, resistance, magnetic or other forms of electronic components for determining angular displacement. A complementary signal generating circuit may similarly attach to the upper leg for operating with the corresponding selected variety of electronic sensor employed on the lower leg.

Each of the versions of this invention provide for a number of improvements and advantages over the prior art. The design of the digital protractor is extremely compact and versatile. This is enabled by the stacked and modular nature of the protractor's components. The arms are quite thin and pivot relative to one another in a laminar fashion. The arms are likewise substantially congruent to one another and conform to the shape and width of the digital readout. As a result, the protractor is able to take measurements in extremely tight and space restricted work spaces and on virtually any type of woodworking or metalworking machine. The compact and stacked component design achieves highly precise measurements so that tools and machines may be properly adjusted and other angular measurements, markings or adjustments can be performed in a quick, convenient and accurate fashion. The protractor works equally effectively in both vertical and horizontal planes, as well as other planar orientations. The provision of magnetic engagement edges along all four edges of the protractor arms allows settings and measurements to be held for as long as needed to perform a desired operation or adjustment or to achieve a needed measurement. The compact and slim lines of the protractor minimizes the amount of storage space required for the tool. The compact modular construction significantly reduces the cost of manufacturing/purchasing the tool and allows it to be used effectively for virtually any industrial, commercial or household application involving angular measurements.

From the foregoing it may be seen that the apparatus of this invention provides for a compact digital protractor, and particularly to a digital protractor that can be used in virtually any plane to measure, mark or set an angular displacement. While this detailed description has set forth particularly preferred embodiments of the apparatus of this invention, numerous modifications and variations of the structure of this invention, all within the scope of the invention, will readily occur to those skilled in the art. Accordingly, it is understood that this description is illustrative only of the principles of the invention and is not limitative thereof.

Although specific features of the invention are shown in some of the drawings and not others, this is for convenience only, as each feature may be combined with any and all of the other features in accordance with this invention.

Other embodiments will occur to those skilled in the art and are within the following claims:

What is claimed is:

1. A digital protractor for measuring an angular displacement from a reference surface, which reference surface carries a magnetically attracted material, said protractor comprising:
a pair of pivotally interconnected upper and lower arms, which arms are superposable upon one another, each arm having a pair of substantially parallel engagement edges extending longitudinally of said arm, one of said arms being engagable with the reference surface along a selected one of said engagement edges of said arm, each said engagement edge having a channel formed therein for receiving a respective magnetic element that is confined within and does not protrude laterally from said channel, which magnetic element is for adhering to the magnetically attracted material carried by the reference surface when the engagement edge carrying said magnetic element is engaged with the reference surface;
an electronic sensor secured to said lower arm; and
a digital readout device secured to said upper arm for operatively cooperating with said electronic sensor to measure and display the angular displacement from the arm engaging the reference surface to the other arm.

2. The device of claim 1 in which said digital readout includes a calibration switch that is engaged for said readout to display an angular displacement of zero degrees regardless of the angular displacement between said arms.

3. The device of claim 1 in which said sensor includes a capacitive sensor disk fixed to said lower arm and said readout includes a signal generating circuit attached to said upper arm for operatively cooperating with said capacitive sensor to measure an angular displacement between said arms and a display device connected to said signal generating circuit for displaying the measured angular displacement between said arms.

4. The device of claim 3 in which said upper arm includes a longitudinal central channel for accommodating said signal generating circuit therein.

5. The device of claim 3 in which said arms are connected by a pivot pin and said annular disk is disposed about said pin.

6. The device of claim 3 in which said annular disk and said signal generating circuit are enclosed by a housing from which said display is exposed.

7. The device of claim 1 in which said sensor includes an annular disk disposed about said pivot pin for operatively cooperating with said digital readout.

8. The device of claim 1 in which said upper and lower arms comprise a respective pair of superposable plates interconnected by a pivot pin that extends transversely through superposed, generally flat surfaces of said plates.

9. The device of claim 8 in which said plates are pivotable relative to one another in a generally laminar manner with a substantially flat bottom surface of said upper arm being substantially parallel to an opposing flat top surface of said lower arm.

10. The device of claim 1 in which each said engagement edge includes a pair of substantially parallel ridges formed respectively above and below said channel and said magnetic element carried therein for selectively directly engaging the reference surface such that said magnetic element adheres to the magnetically attracted material carried by the reference element.

11. The device of claim 10 in which each channel extends longitudinally in a respective engagement edge.

12. A digital protractor for measuring an angular displacement from a reference surface, said protractor comprising:
   a substantially congruent pair of pivotally interconnected upper and lower arms, which arms are superposable upon one another, each arm having a pair of substantially parallel engagement edges extending longitudinally of said arm, one of said arms being engagable along an engagement edge thereof with the reference surface;
   an electronic sensor secured to said lower arm;
   a digital readout device secured to said upper arm for operatively cooperating with said electronic sensor to measure and display the angular displacement from the arm engaging the reference surface to the other arm and;
   a locking apparatus for holding said arms together to maintain a selected angular displacement between said arms, said arms being pivotally connected by a pivot pin and said locking apparatus including a lock plate secured by said upper arm and having a locking engagement surface and central opening through which said pivot pin extends, and a locking lever connected pivotally to said pin and extending outwardly of said upper arm and carrying a bearing for interengaging said locking engagement surface of said lock plate when said lock lever is rotated about said pivot pin in a selected direction to tighten interengagement between said arms and hold said arms with a selected angular displacement therebetween, said locking engagement surface including a tapered groove formed in said locking plate and said bearing including a ball bearing carried by said locking lever and received in said tapered groove whereby rotating said lever directs said ball bearing into a shallow portion of said groove to tighten interengagement between said upper and lower arms and hold said arms at the selected angular displacement.

13. The device of claim 12 in which each engagement edge carries a magnetic element for adhering to a magnetically attracted material carried by the reference surface.

14. The device of claim 13 in which each engagement edge includes a longitudinal channel for receiving a respective magnetic element.

15. A digital protractor for measuring an angular displacement from a reference surface to a second surface, each of which surfaces includes a magnetically attracted material, said protractor comprising:
   a substantially congruent pair of pivotally interconnected upper and lower arms, which arms are superposable upon one another, each arm having a pair of substantially parallel engagement edges extending longitudinally of said arm, one of said arms being engagable with the reference surface along a selected engagement edge of said arm, the other said arm being engagable with the second surface along a selected engagement edge of said other arm, each engagement edge in each arm including a longitudinal channel for receiving a respective magnetic element, which magnetic element is confined within said longitudinal channel such that said magnetic element does not extend laterally beyond said engagement edge;
   an electronic sensor secured to said lower arm; and
   a digital readout device secured to said upper arm for operatively cooperating with said electronic sensor to measure and display the angular displacement from said arm engaging the reference surface to the other said arm engaging the second surface, a respective pair of said magnetic elements for holding the angular displacement set between the arms and the resulting measurement thereof.

16. The device of claim 15 in which each said engagement edge of each said arm extends to a distal end of said arm.

17. The device of claim 16 in which each said longitudinal channel extends through a respective said engagement edge to said distal end of said arm, and wherein a respective said magnetic element extends through said channel to said distal end of said arm.

* * * * *